United States Patent [19]

Miller

[11] Patent Number: 4,554,302

[45] Date of Patent: Nov. 19, 1985

[54] AROMATIC POLYCARBONATE CONTAINING N,N-DIALKYL AMIDE MOLD RELEASE AGENT

[75] Inventor: Kenneth F. Miller, Mt. Vernon, Ind.

[73] Assignee: General Electric Company, Mt. Vernon, Ind.

[21] Appl. No.: 688,245

[22] Filed: Jan. 2, 1985

[51] Int. Cl.⁴ .............................................. C08L 69/00
[52] U.S. Cl. .................................... 524/233; 528/492
[58] Field of Search ................. 524/233; 528/199, 492

[56] References Cited

U.S. PATENT DOCUMENTS 3,072,613 1/1963 Whelan et al. ....................... 524/233
3,245,963 4/1966 Schramm et al. .................... 524/233
4,119,603 10/1978 Holub et al. ........................... 524/94

Primary Examiner—Harold D. Anderson
Attorney, Agent, or Firm—Martin B. Barancik

[57] ABSTRACT

A composition comprising an aromatic carbonate polymer in admixture with a mold release effective amount of a compound of the formula

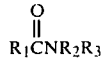

wherein $R_1$, $R_2$ and $R_3$ are the same or different and are alkyl of one to twenty-five carbon atoms, inclusive with the proviso that the amide is not excessively volatizable under polymer processing conditions.

6 Claims, No Drawings

AROMATIC POLYCARBONATE CONTAINING N,N-DIALKYL AMIDE MOLD RELEASE AGENT

BACKGROUND OF THE INVENTION

Injection molding provides a convenient way for preparing various articles from thermoplastic resins, particularly objects of a relatively intricate nature. In order to injection mold articles in an economic manner, it is important to minimize the adhesion of the molded part to the mold surface through the use of a release agent. It is additionally advantageous that the release agent be incorporated in the material to be demolded. However, such an internal agent must be compatible with the resin as measured by the usual characteristics of the resin under normal conditions and heat treatments.

Of the thermoplastic resins which find a mold release agent useful from time to time one of the most sensitive to chemical attack or degradation is polycarbonate. The carbonate bond is susceptible to bond cleavage, for example, hydrolysis from the usual sources. Acids and various acid derivatives have been used as mold release agents for polycarbonate. Examples of carboxylic acids employed as mold release agents for polycarbonate include U.S. Pat. Nos. 4,409,351 and 4,408,000. Examples of carboxylic acid esters useful as mold release agents for polycarbonate include U.S. Pat. Nos. 3,836,499; 4,097,435; 3,784,595; 4,065,436; 4,131,575; 4,444,935; and 4,446,268. Amides in general are also known as additives useful in improving the processing of polycarbonates, U.S. Pat. No. 4,119,603. Certain carboxylic acid amides have been employed as mold release agents in polycarbonate but have met with limited utility. Specifically, the Mitsubishi Gas Chemical Japanese application No. 72 41092 describes three different amides—lauryl amide, stearyl amide and ethylene bis stearamide— as mold release agents for polycarbonate at 0.5 wt. percent levels and found that an ester exchange reaction with the polycarbonate had occured. It has also been found that amides lead to unacceptable drops in melt viscosity.

It is thus perceived that amides would not be thought to be useful additives for polycarbonate. It has now been surprisingly found that a limited class of amides are effective mold release agents for polycarbonate without seriously compromising the properties of the resin under normal molding conditions.

DESCRIPTION OF THE INVENTION

In accordance with the invention, there is a composition comprising an aromatic carbonate polymer in admixture with a mold release effective amount of an amide of the formula

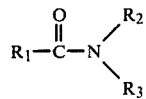

FIG. 1 wherein $R_1$, $R_2$ and $R_3$ are the same or different and are alkyl of one to about 25 carbon atoms, inclusive, with the proviso that the amide is not excessively volatizable under polymer processing conditions.

The aromatic carbonate polymers are prepared by well known techniques available in the art, see for example U.S. Pat. No. 4,444,935, column 2, line 26 to column 3, line 61. The amides can be prepared by the well known reaction of an alkyl acid chloride with the desired amine.

The amides of this invention are also suitable as mold release agents for blends of polycarbonates or copolyestercarbonates with various other polymers, for example polyalkylene terephthalates. Other polymer systems include blends of polycarbonate or copolyestercarbonate with aromatic polyesters of cyclohexane dimethanol. The polyesters have units derived from the above diol and terephthalic acid or ester precursor or mixtures of terephthalic acid and isophthalic acid or their ester precursors. An example of the latter is known as Kodar A150 ® and is available from Eastman. Also present in the series of polyesters can be alkylene units of two to four carbon atoms derived from glycols such as ethylene glycol and butylene 1,4 glycol. The molar units of alkylene glycol residues to cyclohexane dimethanol residue in the polymer can vary from about 1:4 to 4:1.

The amides useful in this invention are those of Figure I. Any amide of Figure I which is insufficiently volatile at processing conditions so as to maintain most of its presence in the composition can be used. The alkyl groups can be normal or branched. Examples of the alkyl groups include methyl, ethyl, isopropyl, butyl, 2,2-dimethylbutyl, 2,2,4-trimethylpentyl, isodecyl, butyldecyl, octadecyl, eicosyl and the like. Illustrative compounds of Figure I include compounds wherein $R_1$ is tridecyl, $R_2$ is methyl and $R_3$ is methyl; $R_1$ is ethyl, $R_2$ is methyl and $R_3$ is lauryl; $R_1$ is methyl and $R_2$ and $R_3$ are octyl.

An effective mold releasing amount of the compound of Figure I is employed in the thermoplastic composition. Any amount of material which reduces the amount of pressure needed to eject the article from the injection mold and obtain an substantially unblemished article in comparison to the pressure needed to eject the thermoplastic composition control is an effective mold releasing amount. In general, effective amounts of the compound of Formula I are from about 0.01 to about 1.0 weight percent, based on the quantity of thermoplastic resin present, preferably from about 0.05 to about 0.5 weight percent. The material can be added to the resin in the normal manner that the other additives are added, for example, in the dry or liquid stage and coextruded. Depending upon the volatility of the compound at common processing and extrusion temperatures, an excess may be initially employed in the composition.

Other common additives for thermoplastic resins may also be employed. For example with respect to aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancers, antioxidants, solvent resistance enhancers, ultraviolet light stabilizers and various inert fillers. Impact modifiers may also be present in the composition. Active fillers and pigments can be used with passivating agents and treatments.

Below are specific examples of the invention. The examples are intended to illustrate but not narrow the inventive concept. All percentages of the additives are in weight percent of the thermoplastic resin.

In all the ensuing examples the aromatic polycarbonate is LEXAN ® 140, a polymer produced by reacting bisphenol-A and phosgene. The mold release agent was dry formulated into the polycarbonate at levels of 0.3 weight percent unless otherwise stated. Also present in the composition was 0.03 weight percent of a phosphite stabilizer.

Mold release effectiveness was determined in an injection molding machine with a 4 ounce shot capacity. The part molded was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied. The ejector pin pressure, measured in pounds per square inch, reflects the difficulty of ejecting the part under mold conditions. Results are reported below in Table I.

The Yellowness Index (Y.I.) was measured in accordance with ASTM D1825 on 2"×3"×⅛" chips molded at 580° and 650° F. The magnitude of the yellowness index and the difference in the Y.I. at two molding temperatures are both indications of the detrimental effect of an additive on the optical properties of polycarbonate. These measurements are also reported in Table I.

The Kasha Index (KI) was measured to determine the effect of the amide release agents on the melt stability of the resin. The KI of a resin is a measurement of its melt viscosity and is obtained in the following manner: 7 grams of resin, dried a minimum of 90 minutes at 125° C., are added to a modified Tinius-Olsen model T3 melt indexer; the temperature in the indexer is maintained at 300° C. and the resin is heated at this temperature for 6 or 12 minutes; after 6 or 12 minutes the resin is forced through a 0.04125 inch radius orifice using a plunger of radius 0.1865 inch and an applied force of 17.7 lbs.; the time required for the plunger to travel two inches is measured in centiseconds; that is reported as the KI. For a given resin compounded with a series of different additives, the most melt stable additive (i.e. the additive which reduces the melt viscosity of the resin the least) will display the highest KI. Additionally, the smaller the KI drop between 6 and 12 minutes residence times or the smaller the KI drop between pellet and part KI, the more melt stable the resin additive. Six and twelve minutes as well as part KI data are presented in Table I.

TABLE I

| ADDITIVE | EJECTION PRESSURE (psi) | PELLET KI (cs) 6 MIN | PELLET KI (cs) 12 MIN | 650° F. PART KI (6 MIN) CENTISECONDS | YI 580° F. | YI 650° F. | DELTA YI |
|---|---|---|---|---|---|---|---|
| Pentaerythritol tetrastearate | 5005 | 2820 | 2840 | 2770 | 1.7 | 1.7 | 0.0 |
| N,N dimethyl stearamide | 4220 | 2610 | 2390 | 2280 | 2.6 | 2.8 | 0.2 |
| N—methyl, N-(C$_{13}$, C$_{15}$ alkyl acetamide)* | 5300 | 2320 | 2210 | 1960 | 2.1 | 2.5 | 0.4 |
| N—methyl stearamide | 3800 | 2170 | 1730 | 1410 | 5.7 | 18.6 | 12.9 |
| Stearamide | 3350 | 1740 | 1610 | 1480 | 2.0 | 2.5 | 0.5 |

*This dialkyl acetamide was prepared by the reaction of acetyl chloride with a synthetic fatty amine sold under the tradename of Synprolam 35M by ICI where R is a mixture of approximately 70% C$_{13}$ and 30% C$_{15}$.

The ejection pressure data shows that amides of the invention exhibit mold release behavior that is equivalent to or better than the behavior of a known mold release agent, pentaerythritol tetrastearate. However, amides which are not N,N"-dialkylated (i.e. N-methyl stearamide and stearamide) provided much lower resin melt viscosity as measured by 6 and 12 min. KI. In addition, the mono N-alkylated amides gave rise to large increases in the yellowness, especially when molded at high temperature.

What is claimed is:

1. A composition comprising an aromatic carbonate polymer in admixture with a mold release effective amount of a compound of the formula

wherein R$_1$, R$_2$ and R$_3$ are the same or different and are alkyl of one to twenty-five carbon atoms, inclusive with the proviso that the amide is essentially nonvolatizable under polymer processing conditions.

2. The composition in accordance with claim 1 wherein the aromatic carbonate polymer is bisphenol-A polycarbonate.

3. The composition in accordance with claim 1 wherein R$_2$ is alkyl of one to four carbon atoms, inclusive and R$_3$ is alkyl of one to four carbon atoms, inclusive.

4. The composition in accordance with claim 1 wherein R$_1$ is alkyl of one to four carbon atoms, inclusive, R$_2$ is alkyl of one to four carbon atoms, inclusive and R$_3$ is alkyl of one to twenty-five carbon atoms, inclusive.

5. The composition in accordance with claim 1 wherein R$_1$ is heptadecyl, R$_2$ is methyl and R$_3$ is methyl.

6. The composition in accordance with claim 1 wherein R$_1$ is methyl, R$_2$ is methyl and R$_3$ is a mixture of tridecyl and pentadecyl.

* * * * *